Patented June 4, 1946

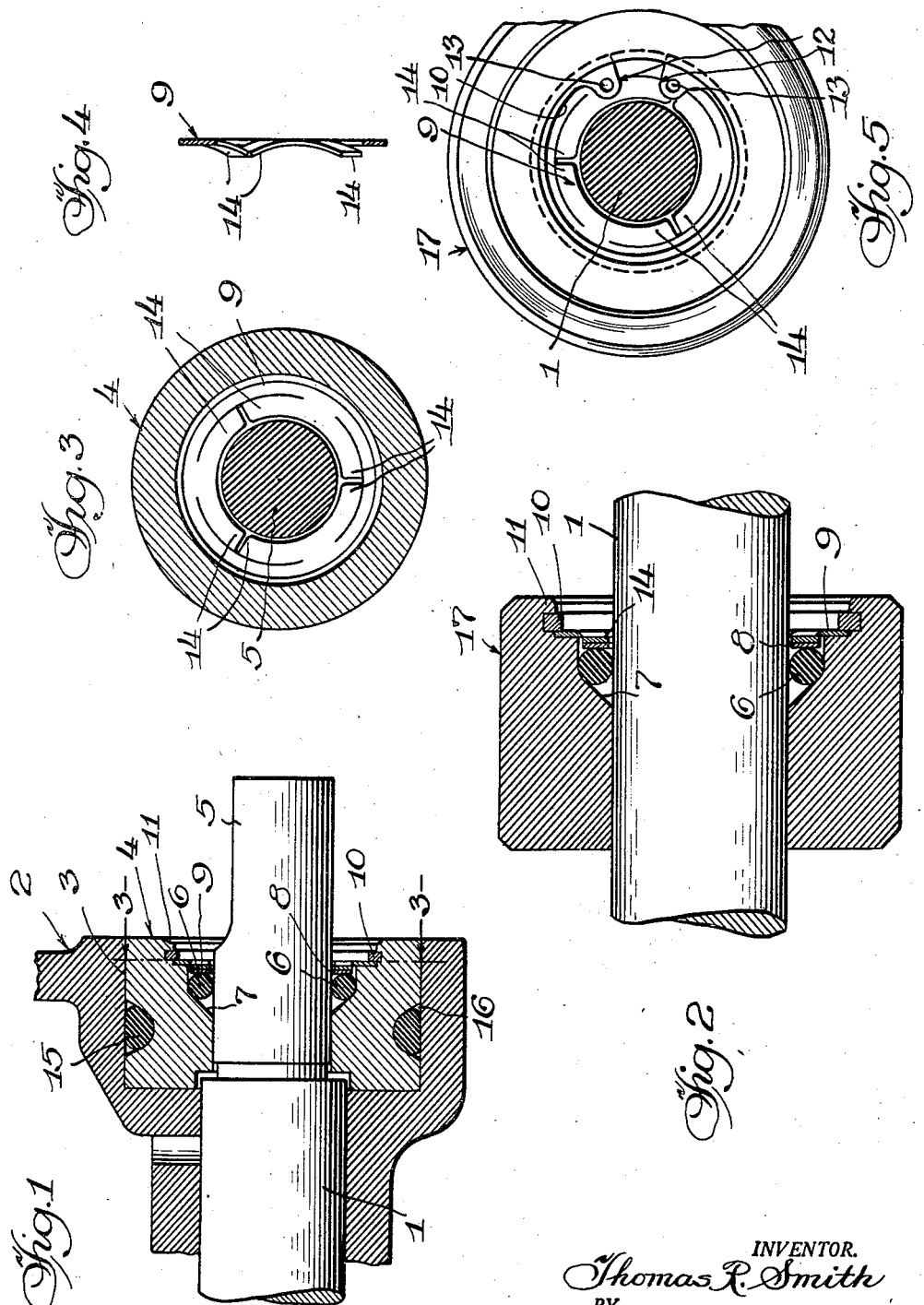

2,401,379

UNITED STATES PATENT OFFICE 2,401,379

SPRING LOADED SEAL FOR SHAFTS AND BEARINGS

Thomas R. Smith, Newton, Iowa, assignor to The Maytag Company, Newton, Iowa, a corporation of Delaware Application June 10, 1944, Serial No. 539,634

1 Claim. (Cl. 286—30)

The present invention relates to a novel seal construction and especially to a spring loaded seal for sealing the space between a rotating shaft such as the worm drive shaft of a washing machine or other mechanism and the surrounding housing or member through which an end of the shaft projects.

Among the objects of the present invention is to provide a novel seal construction comprising a conical surface in the housing or member encompassing the shaft to be sealed, against which is held a resilient sealing ring under spring tension in such manner as to compensate for any wear or permanent set of the sealing ring.

The invention comprehends machining the conical surface directly in the material of the gear case or housing, or in a separate adaptor or plug which may be inserted in a counterbored opening in the housing or case. In the latter construction, the adaptor or plug and the spring loaded seal form a unit assembly in which the adaptor or plug provides a bushing for the shaft as well as a closure for the housing.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary view in vertical cross section through a housing or gear case provided with an adaptor in which the novel seal construction is embodied.

Figure 2 is a view in vertical cross section through a housing or gear case with the novel seal construction embodied therein.

Figure 3 is a view in vertical cross section taken in a plane represented by the line 3—3 of Figure 1.

Figure 4 is a view in vertical cross section through the spring shown in Figures 1, 2 and 3.

Figure 5 is a fragmentary view in end elevation of the construction shown in Figure 3.

Referring to the disclosure in the drawing and more particularly to the novel embodiment selected to illustrate the invention in Figure 1, a shaft 1 such as the rotating worm drive shaft for a washing machine or other mechanism is shown journaled in a housing or gear case 2 with the latter counterbored at 3 to receive an adaptor or plug 4 carrying the novel seal assembly. This adaptor or plug may be of any bearing metal or other material suitable for the purpose and provides a bushing for the end 5 of the shaft.

The novel seal construction comprises a resilient sealing ring 6 of circular cross section forced into position and held against a conical surface 7 machined or formed within the inner diameter of the adaptor or plug 4 by means of a flat washer 8 held in tension by a spring 9. The spring 9 and seal assembly is secured in place by means of an expansible retaining or snap ring 10 adapted to seat within a channel or recess provided in the adaptor 4 adjacent the shoulder 11. The ends 12 of this ring are each provided with an opening 13 for the insertion of a sharp instrument, tool or the like, whereby these ends may be drawn together to disengage the ring 10 from its recess and permit its removal, as well as the removal of the spring 9, washer 8 and sealing ring 6. The spring 9 is shown provided with rearwardly projecting spring fingers 14 adapted to engage the flat washer 8 which in turn forces the resilient sealing ring 6 against the conical surface 7 in the adaptor or housing 5. Due to this conical surface, the seal is forced and directed into and maintained in intimate contact with the shaft, thereby forming an effective seal under all operating conditions. The back-up pressure of the spring takes care of any permanent set or wear on the sealing ring.

To prevent leakage around the adaptor, a substantially wedge-shaped resilient sealing ring 15 is provided. This sealing ring is mounted in a substantially V-shaped recess 16, the sealing ring functioning as a static seal around the periphery of the adaptor.

The seal construction and assembly shown in Figures 2 and 5 is similar to that shown in Figures 1 and 3 and similar reference characters have been applied thereto, but the assembly is mounted directly in the gear casing or housing 17. In this form of construction the conical surface 7 is machined directly in the gear case 17, the body of the material forming the housing. In this form of construction the adaptor and the sealing ring 15 are not required.

The resilient sealing ring 6 as well as the resilient sealing ring 15, where employed, are preferably formed of a compounded synthetic or natural rubber having the desired oil or other fluid resisting properties as well as sufficient inherent resiliency or elasticity to maintain sealing contact with the surfaces to be sealed under any and all conditions encountered in operation. Where the fluid pressure is relatively high, the seal assembly is preferably installed on the high pressure side.

Although the novel seal is disclosed as encompassing and associated with a rotatable shaft, it is to be understood that the present seal may be applied to a reciprocating shaft or one which is both rotated and reciprocated.

Having thus disclosed my invention, I claim:

A spring loaded seal assembly for sealing a movable shaft having an end thereof projecting through a bore in an encompassing member and sealing the shaft thereat, comprising a cylindrical and a rearwardly tapered surface in the member surrounding the shaft, a resilient sealing ring encompassing the shaft within the cylindrical surface and pressed into sealing contact with the tapered surface and shaft, a washer contacting the sealing ring, resilient means engaging the washer for continuously forcing the sealing ring against the reduced taper of the surface and shaft for sealing the shaft against leakage, and a snap ring mounted in the bore for retaining the assembly in sealing relation.

THOMAS R. SMITH.